(12) United States Patent
Pan et al.

(10) Patent No.: US 10,372,258 B2
(45) Date of Patent: Aug. 6, 2019

(54) TOUCH-CONTROL DISPLAY DEVICE

(71) Applicants: Xiamen Tianma Micro-electronics Co., Ltd., Xiamen (CN); Tianma Micro-electronics Co., Ltd., Shenzhen (CN)

(72) Inventors: Chaohuang Pan, Xiamen (CN); Poping Shen, Xiamen (CN); Zhonghuai Chen, Xiamen (CN); Sichao Ke, Xiamen (CN); Yumin Xu, Xiamen (CN); Zhijian Zhang, Xiamen (CN); Ting Zhou, Xiamen (CN); Jiaqi Kang, Xiamen (CN); Yingzhang Qiu, Xiamen (CN); Shaoting Lin, Xiamen (CN); Yuping Ma, Xiamen (CN)

(73) Assignees: Xiamen Tianma Micro-electronics Co., Ltd., Xiamen (CN); Tianma Micro-electronics Co., Ltd., Shenzhen (CN)

( * ) Notice: Subject to any disclaimer, the term of this patent is extended or adjusted under 35 U.S.C. 154(b) by 71 days.

(21) Appl. No.: 15/132,597

(22) Filed: Apr. 19, 2016

(65) Prior Publication Data
US 2017/0192582 A1 Jul. 6, 2017

(30) Foreign Application Priority Data

Dec. 31, 2015 (CN) .......................... 2015 1 1028013

(51) Int. Cl.
*G06F 3/041* (2006.01)
*G06F 3/044* (2006.01)
*G09G 3/36* (2006.01)

(52) U.S. Cl.
CPC ............ *G06F 3/0416* (2013.01); *G06F 3/044* (2013.01); *G06F 3/0412* (2013.01);
(Continued)

(58) Field of Classification Search
CPC ........ G06F 2203/04106; G06F 3/0412; G06F 3/0414; G06F 3/0416; G06F 3/044;
(Continued)

(56) References Cited

U.S. PATENT DOCUMENTS

| 7,990,481 B2 * | 8/2011 | Hur ....................... G06F 3/0412 345/173 |
| 8,466,900 B2 * | 6/2013 | Kawaguchi ............. G06F 3/044 345/173 |

(Continued)

FOREIGN PATENT DOCUMENTS

| CN | 102236447 A | 11/2011 |
| CN | 103293780 A | 9/2013 |

(Continued)

*Primary Examiner* — Michael J Jansen, II
(74) *Attorney, Agent, or Firm* — Anova Law Group, PLLC

(57) ABSTRACT

A touch-control display device includes a driving module, a first substrate disposed with one or more first force touch-control components, and a second substrate disposed with one or more second force touch-control components and one or more self-capacitance type touch-control electrodes. The first substrate and the second substrate are oppositely disposed, with a variable gap between the first substrate and the second substrate. The second force touch-control component comprises a plurality of first electrodes arranged in a matrix, and the plurality of first electrodes are connected to the driving module respectively through their corresponding first conducting wires. The self-capacitance type touch-control electrode comprises a plurality of second electrodes arranged in a matrix, and the plurality of second electrodes are connected to the driving module respectively through their corresponding second conducting wires.

20 Claims, 14 Drawing Sheets

(52) U.S. Cl.
CPC ......... *G06F 3/0414* (2013.01); *G06F 3/0445*
(2019.05); *G06F 2203/04106* (2013.01); *G09G 3/3648* (2013.01); *G09G 2300/0426* (2013.01)

(58) Field of Classification Search
CPC ......... G06F 3/047; G06F 3/0445; G09G 3/36; G09G 2300/0426; G09G 3/3648
See application file for complete search history.

(56) References Cited

U.S. PATENT DOCUMENTS

| | | | | |
|---|---|---|---|---|
| 9,158,407 | B2* | 10/2015 | Coulson | G06F 3/044 |
| 9,182,859 | B2* | 11/2015 | Coulson | G06F 3/044 |
| 9,195,354 | B2* | 11/2015 | Bulea | G06F 3/044 |
| 9,201,105 | B2* | 12/2015 | Iida | G06F 3/044 |
| 9,274,662 | B2* | 3/2016 | Schwartz | G06F 3/044 |
| 9,292,138 | B2* | 3/2016 | Gourevitch | G06F 3/044 |
| 9,354,752 | B2* | 5/2016 | Kanehira | G06F 3/0414 |
| 9,459,734 | B2* | 10/2016 | Day | G06F 3/044 |
| 9,459,746 | B2* | 10/2016 | Rosenberg | G06F 3/044 |
| 9,495,046 | B2* | 11/2016 | Moore | G06F 3/0418 |
| 9,563,303 | B2* | 2/2017 | Zhou | G06F 3/0412 |
| 9,563,309 | B2* | 2/2017 | Moon | G06F 3/044 |
| 9,582,108 | B2* | 2/2017 | Yang | G06F 3/044 |
| 9,652,098 | B2* | 5/2017 | Choi | G06F 3/044 |
| 9,690,408 | B1* | 6/2017 | Krah | G06F 3/0412 |
| 9,733,756 | B2* | 8/2017 | Shepelev | G06F 3/0416 |
| 9,733,760 | B2* | 8/2017 | Kim | G06F 3/0416 |
| 9,798,416 | B2* | 10/2017 | Hsiao | G06F 3/0416 |
| 9,857,923 | B2* | 1/2018 | Yun | G06F 3/044 |
| 9,870,109 | B2* | 1/2018 | Bulea | G06F 3/044 |
| 9,971,449 | B2* | 5/2018 | Ding | G06F 3/047 |
| 9,971,463 | B2* | 5/2018 | Shepelev | G06F 3/044 |
| 10,019,104 | B2* | 7/2018 | Yang | G06F 3/0412 |
| 10,042,455 | B2* | 8/2018 | Kawamura | G06F 3/0414 |
| 10,048,789 | B2* | 8/2018 | Filiz | G06F 3/0414 |
| 10,055,071 | B2* | 8/2018 | Jin | G06F 3/044 |
| 10,061,429 | B2* | 8/2018 | Cho | G06F 3/0416 |
| 10,073,557 | B2* | 9/2018 | Chern | G06F 3/0416 |
| 10,152,181 | B2* | 12/2018 | Shih | G06F 3/044 |
| 10,180,747 | B2* | 1/2019 | Liu | G06F 3/0414 |
| 10,191,592 | B2* | 1/2019 | Zhuang | G06F 3/0412 |
| 10,209,819 | B2* | 2/2019 | Lee | G01L 1/146 |
| 10,275,099 | B2* | 4/2019 | Sun | G06F 3/044 |
| 10,289,253 | B2* | 5/2019 | Liu | G06F 3/0412 |
| 2006/0050062 | A1* | 3/2006 | Ozawa | G06F 1/1616 345/173 |
| 2006/0066589 | A1* | 3/2006 | Ozawa | G06F 3/0414 345/173 |
| 2006/0066590 | A1* | 3/2006 | Ozawa | G06F 3/0418 345/173 |
| 2008/0100590 | A1* | 5/2008 | Hur | G06F 3/0412 345/173 |
| 2010/0253651 | A1* | 10/2010 | Day | G06F 3/044 345/175 |
| 2011/0157087 | A1* | 6/2011 | Kanehira | G06F 3/0414 345/174 |
| 2011/0279406 | A1* | 11/2011 | Kawaguchi | G06F 3/044 345/174 |
| 2012/0001867 | A1* | 1/2012 | Kawaguchi | G06F 3/044 345/174 |
| 2012/0229414 | A1* | 9/2012 | Ellis | G06F 3/044 345/174 |
| 2013/0234734 | A1* | 9/2013 | Iida | G06F 3/044 324/661 |
| 2014/0062933 | A1* | 3/2014 | Coulson | G06F 3/044 345/174 |
| 2014/0062934 | A1* | 3/2014 | Coulson | G06F 3/044 345/174 |
| 2014/0267128 | A1* | 9/2014 | Bulea | G06F 3/044 345/174 |
| 2014/0307186 | A1* | 10/2014 | Yun | G06F 3/045 349/12 |
| 2015/0091859 | A1* | 4/2015 | Rosenberg | G06F 3/044 345/174 |
| 2015/0109233 | A1* | 4/2015 | Moore | G06F 3/0418 345/174 |
| 2015/0153895 | A1* | 6/2015 | Hotelling | G06F 1/1626 345/174 |
| 2015/0177298 | A1* | 6/2015 | Sugiura | G06F 3/044 324/658 |
| 2015/0227229 | A1* | 8/2015 | Schwartz | G06F 3/044 345/174 |
| 2016/0004343 | A1* | 1/2016 | Gourevitch | G06F 3/044 345/174 |
| 2016/0041648 | A1* | 2/2016 | Richards | G01L 25/00 345/174 |
| 2016/0048243 | A1* | 2/2016 | Bulea | G06F 3/044 345/174 |
| 2016/0098109 | A1* | 4/2016 | Choi | G06F 3/044 345/174 |
| 2016/0098131 | A1* | 4/2016 | Ogata | G06F 1/1643 345/173 |
| 2016/0139716 | A1* | 5/2016 | Filiz | G06F 3/0414 345/174 |
| 2016/0170543 | A1* | 6/2016 | Kawamura | G06F 3/03547 345/174 |
| 2016/0188082 | A1* | 6/2016 | Ham | G06F 3/0416 345/174 |
| 2016/0231852 | A1* | 8/2016 | Moon | G06F 3/044 |
| 2016/0291725 | A1* | 10/2016 | Zhai | G06F 3/044 |
| 2016/0291732 | A1* | 10/2016 | Jin | G06F 3/044 |
| 2016/0313853 | A1* | 10/2016 | Liou | G06F 3/044 |
| 2016/0320908 | A1* | 11/2016 | Yang | G06F 3/044 |
| 2016/0334917 | A1* | 11/2016 | Shepelev | G06F 3/0416 |
| 2016/0342256 | A1* | 11/2016 | Zhou | G06F 3/0412 |
| 2017/0010745 | A1* | 1/2017 | Liu | G06F 3/0412 |
| 2017/0031506 | A1* | 2/2017 | Cho | G06F 3/0416 |
| 2017/0045992 | A1* | 2/2017 | Lee | G06F 3/0416 |
| 2017/0068368 | A1* | 3/2017 | Hsiao | G06F 3/0416 |
| 2017/0068376 | A1* | 3/2017 | Kim | G06F 3/0416 |
| 2017/0068383 | A1* | 3/2017 | Chern | G06F 3/0416 |
| 2017/0075493 | A1* | 3/2017 | Lee | G06F 3/0418 |
| 2017/0090610 | A1* | 3/2017 | Shepelev | G06F 3/044 |
| 2017/0115768 | A1* | 4/2017 | Shih | G06F 3/044 |
| 2017/0115812 | A1* | 4/2017 | Lin | G06F 3/0416 |
| 2017/0192565 | A1* | 7/2017 | Pan | G02B 6/0091 |
| 2017/0192582 | A1* | 7/2017 | Pan | G06F 3/0416 |
| 2017/0192596 | A1* | 7/2017 | Lee | G01L 1/146 |
| 2017/0235414 | A1* | 8/2017 | Ding | G06F 3/047 345/174 |
| 2017/0242518 | A1* | 8/2017 | Liu | G06F 3/0414 |
| 2017/0269763 | A1* | 9/2017 | Yang | G06F 3/0412 |
| 2017/0344146 | A1* | 11/2017 | Sun | G06F 3/044 |

FOREIGN PATENT DOCUMENTS

| | | |
|---|---|---|
| CN | 204557445 U | 8/2015 |
| CN | 105117080 A | 12/2015 |
| WO | 2015158097 A1 | 10/2015 |

* cited by examiner

TOUCH-CONTROL DISPLAY DEVICE

CROSS-REFERENCES TO RELATED APPLICATIONS

This application claims priority of Chinese Patent Application No. 201511028013.0, filed on Dec. 31, 2015, the entire contents of which are hereby incorporated by reference.

FIELD OF THE INVENTION

The present disclosure generally relates to the field of display technologies and, more particularly, relates to a display device with built-in self-capacitance touch-control structures and force touch-control components.

BACKGROUND

An integrated touch-control display device is a display device with location touch-control detection structures integrated inside the display device. An integrated touch-control display device has both display and location touch-control detection functions and, thus, is often easy for use and with good human-computer interaction experience. A terminal with an integrated touch-control display device is often thin, light, and highly integrated, thus widely favored by market.

With the development of touch-control technologies, a new type of touch-control technology, force touch-control technology, is gradually attracting attentions. Under external pressure forces, a force touch-control structure may generate different feedback information according to different magnitudes of pressure forces, and thus provide versatile usage experiences. However, with existing technologies, a force touch-control structure is usually an external structure independent of a display device, and the fabrication process of a force touch-control device is usually complicated. Further, a terminal with a force touch-control device is usually thick and heavy.

The disclosed methods and structures are directed to solve one or more problems set forth above and other problems in the art.

BRIEF SUMMARY OF THE DISCLOSURE

One aspect of the present disclosure includes a touch-control display device. The touch-control display device includes a driving module, a first substrate disposed with one or more first force touch-control components, and a second substrate disposed with one or more second force touch-control components and one or more self-capacitance type touch-control electrodes. The first substrate and the second substrate are oppositely disposed, with a variable gap between the first substrate and the second substrate. The second force touch-control component comprises a plurality of first electrodes arranged in a matrix, and the plurality of first electrodes are connected to the driving module respectively through their corresponding first conducting wires. The self-capacitance type touch-control electrode comprises a plurality of second electrodes arranged in a matrix, and the plurality of second electrodes are connected to the driving module respectively through their corresponding second conducting wires.

Other aspects of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

To make the objectives, technical solutions and advantages of the present invention more clear and explicit, the present invention is described in further detail with accompanying drawings and embodiments. It should be understood that the specific exemplary embodiments described herein are only for explaining the present invention and are not intended to limit the present invention.

Reference will now be made in detail to exemplary embodiments of the disclosure, which are illustrated in the accompanying drawings. Wherever possible, the same reference numbers will be used throughout the drawings to refer to the same or like parts.

Figure 1:
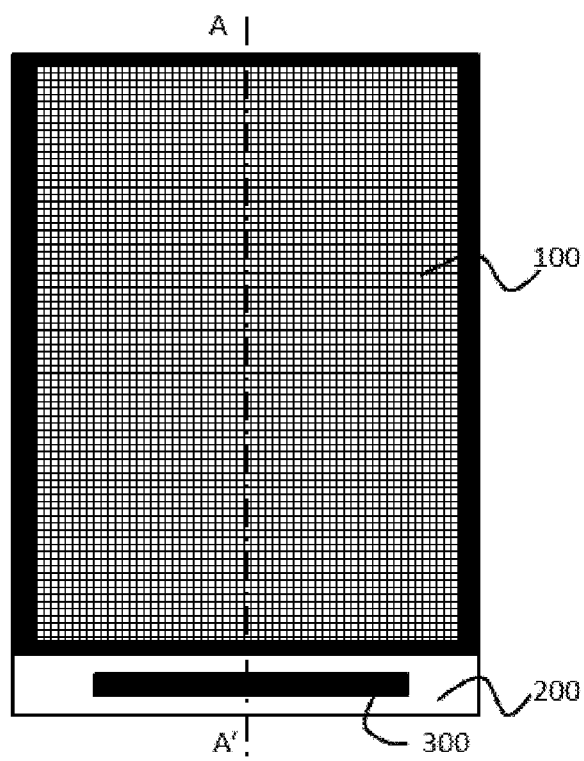
FIG. 1 illustrates a schematic view of an exemplary touch-control display device consistent with the disclosed embodiments.
Figure 2:
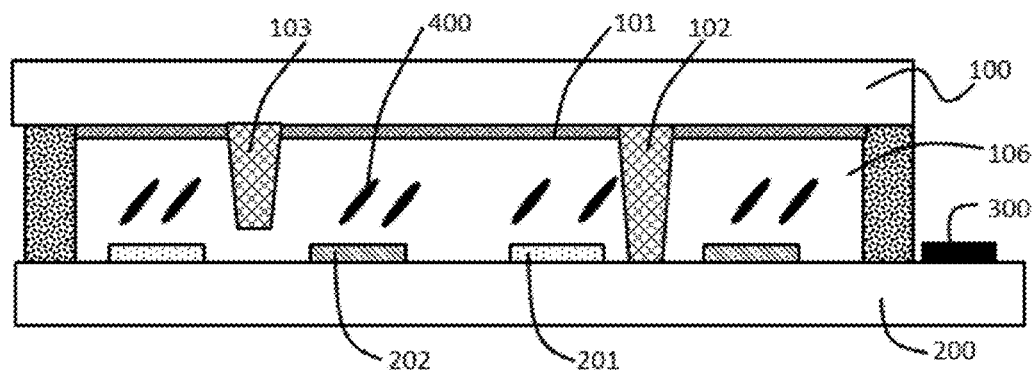
FIG. 2 illustrates a cross-sectional view along direction AA' in FIG. 1.
Figure 3:
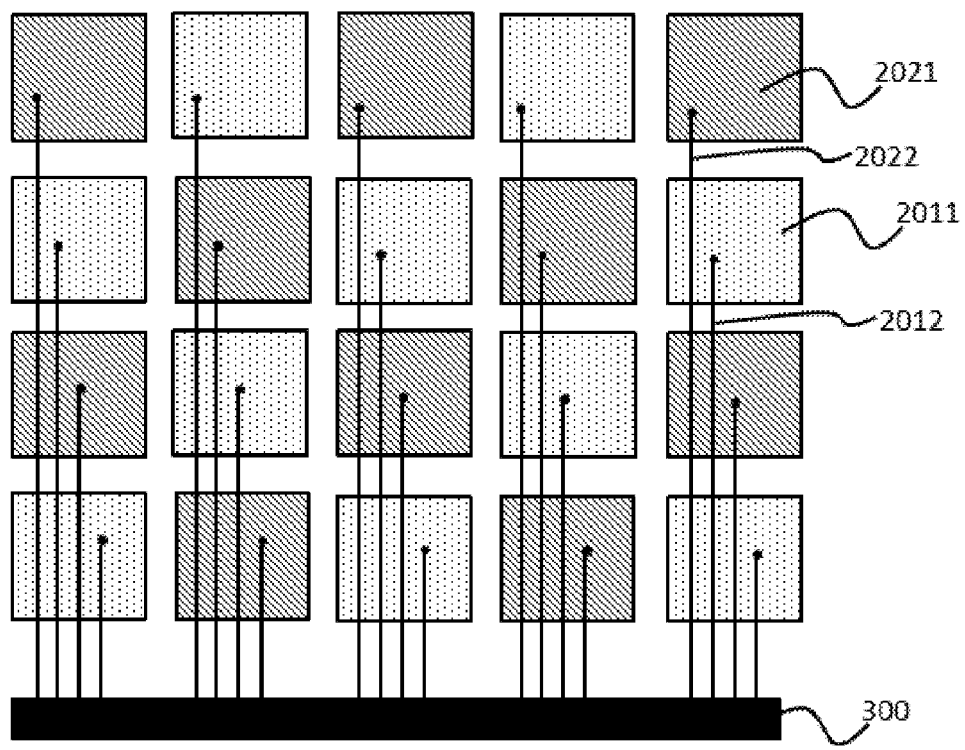
FIG. 3 illustrates a schematic structural view of an exemplary layer where first force touch-control components and self-capacitance type touch-control electrodes are located, consistent with the disclosed embodiments.
Figure 4:
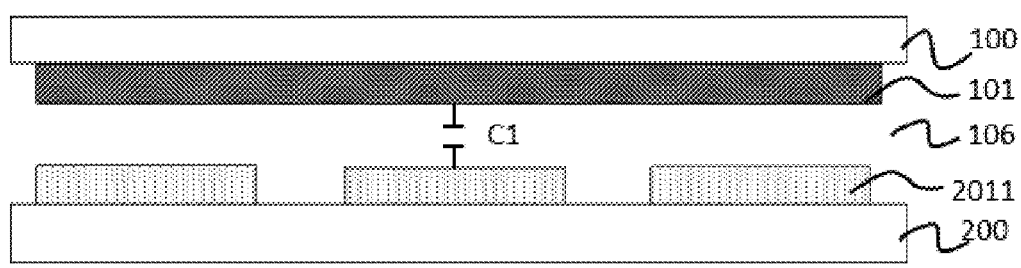
FIG. 4 illustrates a schematic view of an exemplary touch-control display device when no external pressure force is applied, consistent with the disclosed embodiments.
Figure 5:
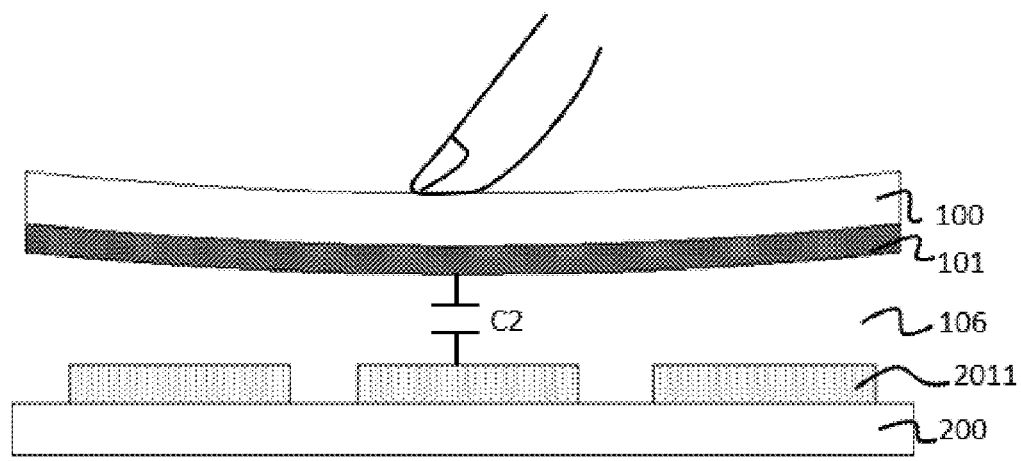
FIG. 5 illustrates a schematic view of an exemplary touch-control display device when an external pressure force is applied, consistent with the disclosed embodiments.

FIGS. 1-5 illustrate an exemplary touch-control display device. FIG. 1 illustrates a schematic view of the exemplary touch-control display device. FIG. 2 illustrates a cross-sectional view along direction AA' in FIG. 1. FIG. 3 illustrates a schematic structural view of an exemplary layer where first force touch-control components and self-capacitance touch-control electrodes are located. FIG. 4 illustrates a schematic view of a touch-control display device when no external pressure force is applied. FIG. 5 illustrates a schematic view of a touch-control display device when an external pressure force is applied.

As shown in FIGS. 1-3, a touch-control display device comprises a first substrate 100, a second substrate 200 that is disposed oppositely to the first substrate 100, and a driving module 300. Other components may also be included.

Further, the touch-control display device may also include a first force touch-control component 101, a second force touch-control component 201, and a self-capacitance touch-control electrodes 202. The first force touch-control component 101 may be disposed at the inner side of the first substrate 100, and the second force touch-control component 201 may be disposed at the inner side of the second substrate 200. The self-capacitance touch-control electrodes 202 may be disposed at the inner side of the second substrate 200.

A liquid crystal layer 400 may be disposed between the first substrate 100 and second substrate 200 to form cells or cell boxes for both display and touch-control. Further, the touch-control display device may include a plurality of supporting columns disposed between the first substrate 100 and the second substrate 200. As shown in FIG. 2, the support columns may include main columns 102 and auxiliary columns 103. The height of a main column 102 is larger than the height of an auxiliary column height 103.

A main role of the supporting columns is to support the variable gap 106 between the first substrate 100 and the second substrate 200. That is, there is variable gap 106 between a first force touch-control component 101 and a second force touch-control component 201. With an external pressure force applied on the first substrate 100 and/or the second substrate 200, the variable gap 106 may be deformed. The magnitude of the external pressure force may be detected from the deformation size of the variable gap 106.

A main role of the main column 102 is to support the initial cell thickness when the first substrate 100 and second substrate 200 are not compressed by an external pressure force. When the first substrate 100 and the second substrate 200 are compressed by an external pressure force, the main column 102 is compressed, and the auxiliary column 103 contacts the inner side of the second substrate 200, supporting the cell thickness.

Because an auxiliary column 103 may also play a supporting role for cell thickness, there are more support columns playing a supporting role, and the density of supporting columns playing a supporting role increases. Therefore, it may be difficult for an external pressure force to further compress the touch-control display device, avoiding irreversible damages to the touch-control display device. When the external pressure force disappears, the first substrate 100 and the second substrate 200 may return to their initial states.

Accordingly, because the touch-control display device includes a plurality of main columns 102 and auxiliary columns 103, when an external pressure force is applied to the touch-control display device, only recoverable deformation may occur. Further, the touch-control display device has good resilience, ensuring the signal accuracy of force detection.

The second force touch-control component 201 may comprise a plurality of first electrodes 2011 arranged in a matrix. The plurality of first electrodes 2011 are connected to the driving module 300 respectively through their corresponding first conducting wires 2012. The self-capacitance type touch-control electrode 202 may comprise a plurality of second electrodes 2021 arranged in a matrix. The plurality of second electrodes 2021 are connected to the driving module 300 respectively through their corresponding second conducting wires 2022.

Figure 21:
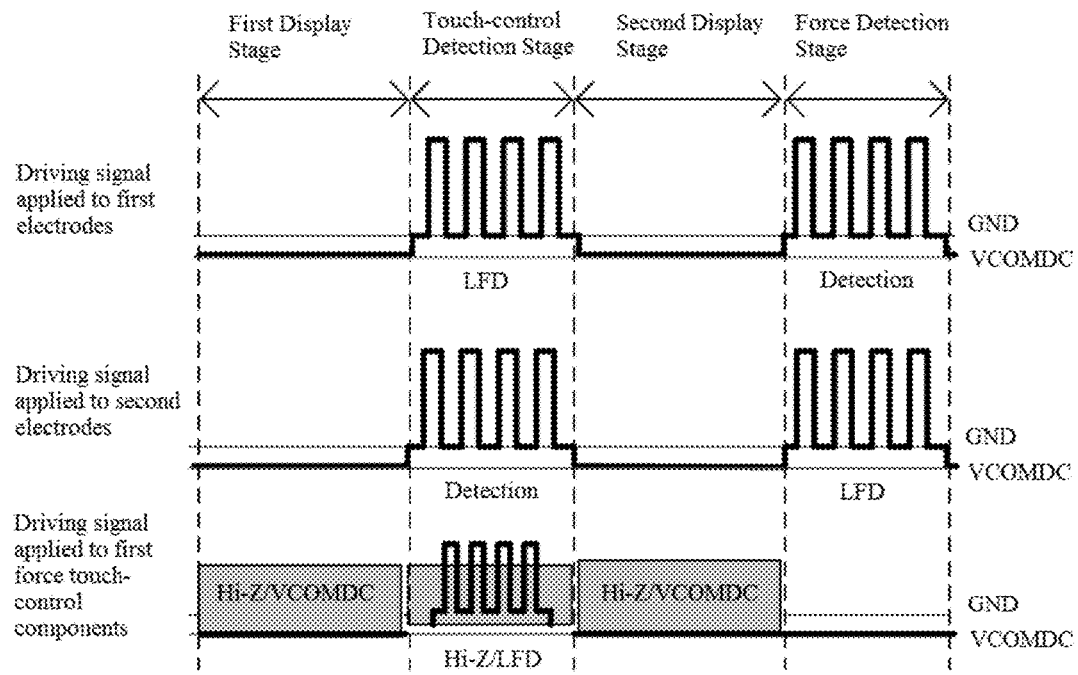
FIG. 21 illustrates an exemplary operating mechanism of a touch-control display device consistent with the disclosed embodiments.

FIG. 21 illustrates an exemplary operating mechanism of a touch-control display device. As shown in FIG. 21, an operating cycle includes four stages: first display stage, touch-control detection stage, second display stage, and force detection stage. In the first display stage and the second display stage, the driving module applies a dc common electrode signal VCOMDC to the plurality of first electrodes and second electrodes, making the touch-control display device to display images. The first force touch-control components may be in a floating (high impedance, or Hi-Z) state, or applied with a dc common electrode signal VCOMDC. In the touch-detection stage, the driving module applies a touch-control detection signal to the second electrodes. The first electrodes are set to a loading free driving (LFD) state for decreasing the coupling capacitance between the electrodes, so as to improve the accuracy of time-sharing detection. The touch-control signal is detected from the capacitance change of the second electrodes to the ground. In the force detection stage, the driving module applies a second force detection signal to the plurality of first electrodes, and concurrently applies a first force detection signal to the first force touch-control component, for detecting whether there is a pressure force applied, and determining the magnitude of the pressure force. The first force detection signal may be a ground signal, or a dc common electrode signal VCOMDC. The second electrodes are set to a loading free driving (LFD) state for decreasing the coupling capacitance between the electrodes, for improving the accuracy of time-sharing detection.

Figure 22:
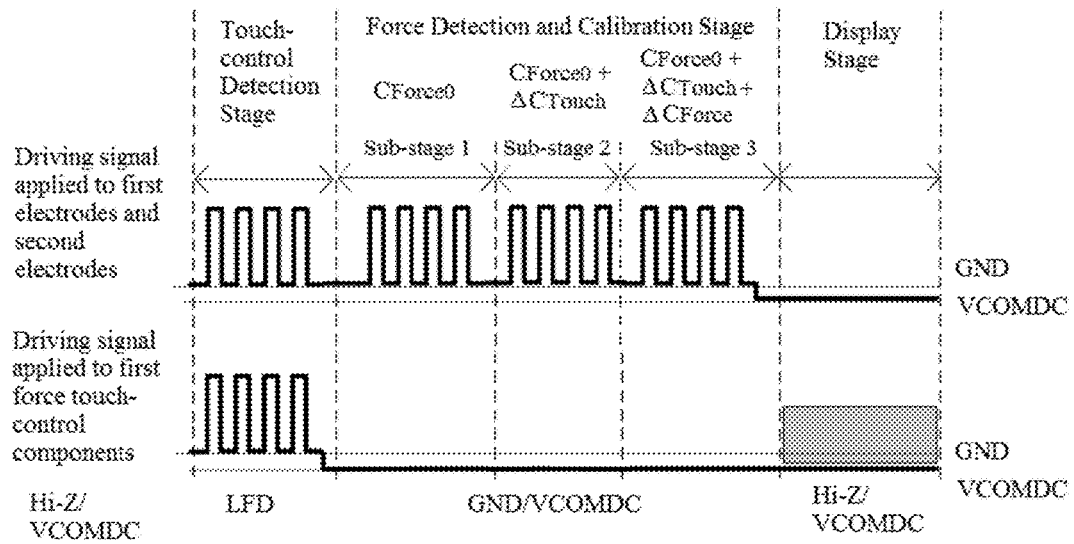
FIG. 22 illustrates another exemplary operating mechanism of a touch-control display device consistent with the disclosed embodiments.
Figure 23:
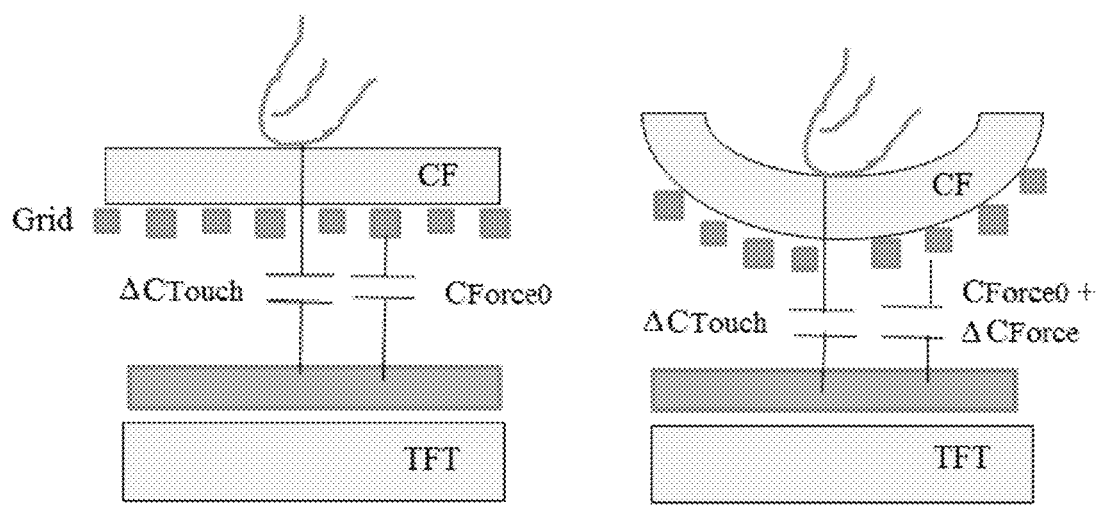
FIG. 23 illustrates two exemplary detection configurations in a force sensing and calibration stage of a touch-control display device consistent with the disclosed embodiments.

FIG. 22 and FIG. 23 illustrate another exemplary operating mechanism of touch-control display devices. As shown in FIG. 22, an operating cycle includes three stages: touch-control detection stage, force sensing and calibration stage, and display stage. In the display stage, the driving module applies a dc common electrode signal VCOMDC to the plurality of first electrodes and second electrodes, making the touch-control display device to display images. The first force touch-control components may be in a floating (high impedance, or Hi-Z) state, or applied with a dc common electrode signal VCOMDC. In the touch-detection stage, the driving module applies a touch-control detection signal to the first electrodes and the second electrodes. The first force touch-control components are set to a loading free driving (LFD) state. The touch-control signal is detected from the capacitance change of the first electrodes and the second electrodes to the ground.

In the force sensing and calibration stage, the driving module applies a force detection signal to the plurality of first electrodes and second electrodes, and concurrently applies a first force detection signal to the first force touch-control component, for detecting whether there is a pressure force applied, and determining the magnitude of the pressure force. The first force detection signal may be a ground signal, or a dc common electrode signal VCOMDC.

As shown in FIG. 22, the force sensing and calibration stage includes three sub-stages: sub-stage 1, sub-stage 2, and sub-stage 3. In the sub-stage 1, the detecting finger does not touch and press the color film substrate, and the capacitance between a first force touch-control component and a first electrode/second electrode is $C_{Force0}$. In the sub-stage 2, the detecting finger touches, but does not press, the color film substrate, and the capacitance between a first force touch-control component and a first electrode/second electrode is $C_{Force0}+\Delta C_{touch}$. In the sub-stage 3, the detecting finger touches and presses the color film substrate, and the capacitance between a first force touch-control component and a first electrode/second electrode is $C_{Force0}+\Delta C_{touch}+\Delta C_{Force}$. The detecting configurations for the sub-stage 2 and the sub-stage 3 are shown FIG. 23. From the capacitance measurement results of the above three sub-stages, the change of capacitance due to the pressure force $\Delta C_{Force}$ may be obtained.

Accordingly, in certain embodiments, the variable gap 106 is the gap between the first substrate 100 and the second substrate 200, and the touch-control display device is a liquid crystal display device. The first substrate 100 is a color film substrate, and the second substrate 200 is an array substrate. The liquid crystal layer 400 is disposed between the color film substrate 100 and the array substrate 200. The size of the variable gap 106 is the thickness of the liquid crystal cell accommodating the liquid crystal layer between the color film substrate 100 and the array substrate 200.

The driving module 300 may provide force detection signals to the electrodes disposed on the first substrate 100 and the second substrate 200.

In a force detection stage, the driving module 300 provides a second force detection signal to the plurality of first electrodes 2011 respectively. At the same time, the driving module 300 also provides a first force detection signal to the first force touch-control component 101. FIG. 4 illustrates a schematic view of a touch-control display device when no external pressure force is applied. As shown in FIG. 4, when no external pressure force is applied to the first touch-control component 101, the variable gap 106 maintains its initial state. The first force touch-control component 101, the first electrode 2011, and the variable gap 106 form a capacitor C1.

FIG. 5 shows a schematic view of a touch-control display device compressed by an external pressure force. As shown in FIG. 5, when the first force touch-control element 101 is compressed by an external pressure force, the variable gap 106 between the first force touch-control component 101 and one or several of the first electrodes 2011 is compressed. The first force touch-control component 101, the first electrode 2011, and the variable gap 106 form a capacitor C2.

Based on the capacitance difference between the capacitor C1 and the capacitor C2, the magnitude of the external pressure force applied to the first force touch-control component 101 may be calculated. Further, as the plurality of first electrodes 2011 are independent of each other, the external pressure force experienced by each region corresponding to a first electrode 2011 may be individually calculated. Therefore, the location and magnitude of the external pressure force may be determined. In the present embodiment, the first force detection signal is a reference signal, and it may be a ground signal.

As shown in FIGS. 1-3, the self-capacitance type touch-control electrode 202 may be disposed between the color film substrate 100 and the array substrate 200. The self-capacitance type touch-control electrode 202 comprises a plurality of second electrodes 2021 arranged in a matrix. The plurality of second electrodes 2021 are, respectively, connected to the driving module 300 through their corresponding second conducting wires 2022. Further, the plurality of second electrodes 2021 of the self-capacitance type touch-control electrode 202 and the plurality of first electrodes 2011 of the second force touch-control component 201 are disposed in a same layer.

Each second electrode 2021 is connected to the driving module 300 through a different second leading wire 2022. When a touch occurs, the driving module 300 may identify the second electrode 2021 that produces the touch signal based on the feedback signals from different second conducting wires 2022. Therefore the touch location may be determined.

Accordingly, the disclosed touch-control display device has both a touch location detection function and a touch force magnitude detection function. In a touch-control detection stage, the driving module 300 provides a touch-control detection signal to the plurality of second electrodes 2021 for detecting the touch location. In a force detection stage, the driving module 300 provides a second force detection signal to a plurality of first electrodes 2011, and provides a first force detection signal to first force touch-control components 101, for detecting whether a pressure force applied at the region corresponding to the first electrode 2011, and for determining the magnitude of the pressure force.

Further, the material of the first force touch-control components 101 may be a transparent conductive material, such as indium tin oxide. First force touch-control component 101 is disposed at the inner side of the first substrate 100. Further, the first force touch-control component 101 is a planar electrode covering an entire surface, or may be a plurality of stripe-shaped electrodes.

The first force touch-control component 101 may cover a plurality of first electrodes 2011, and may also cover a plurality of second electrodes 2021. A first force touch-control component 101 may be disposed outside a display area or at the edge of a display area, can be connected to the second substrate 200 by a conductive adhesive, and can be further connected to the driving module 300 through metal traces on the second substrate 200. The driving module 300 provides a first force detection signal to the first force touch-control component 101.

Accordingly, the disclosed touch-control display device may have the following advantages. First, force touch-control components and self-capacitance touch-control electrodes are integrated inside the display device and, thus, the display device may concurrently have a location detection function and a force detection function. Second, the second force touch-control components and self-capacitance type touch-control electrodes are integrated in a same layer, so the display device has a high integration level, a small size, a light weight, a good reliability, and a long life. Third, as the plurality of first electrodes of the second force touch-control component and the plurality of second electrodes of the self-capacitance touch-control electrode are disposed in a same layer, the first electrodes and the second electrodes may be formed in a same process step, and thus the manufacturing process is simple.

Figure 9:
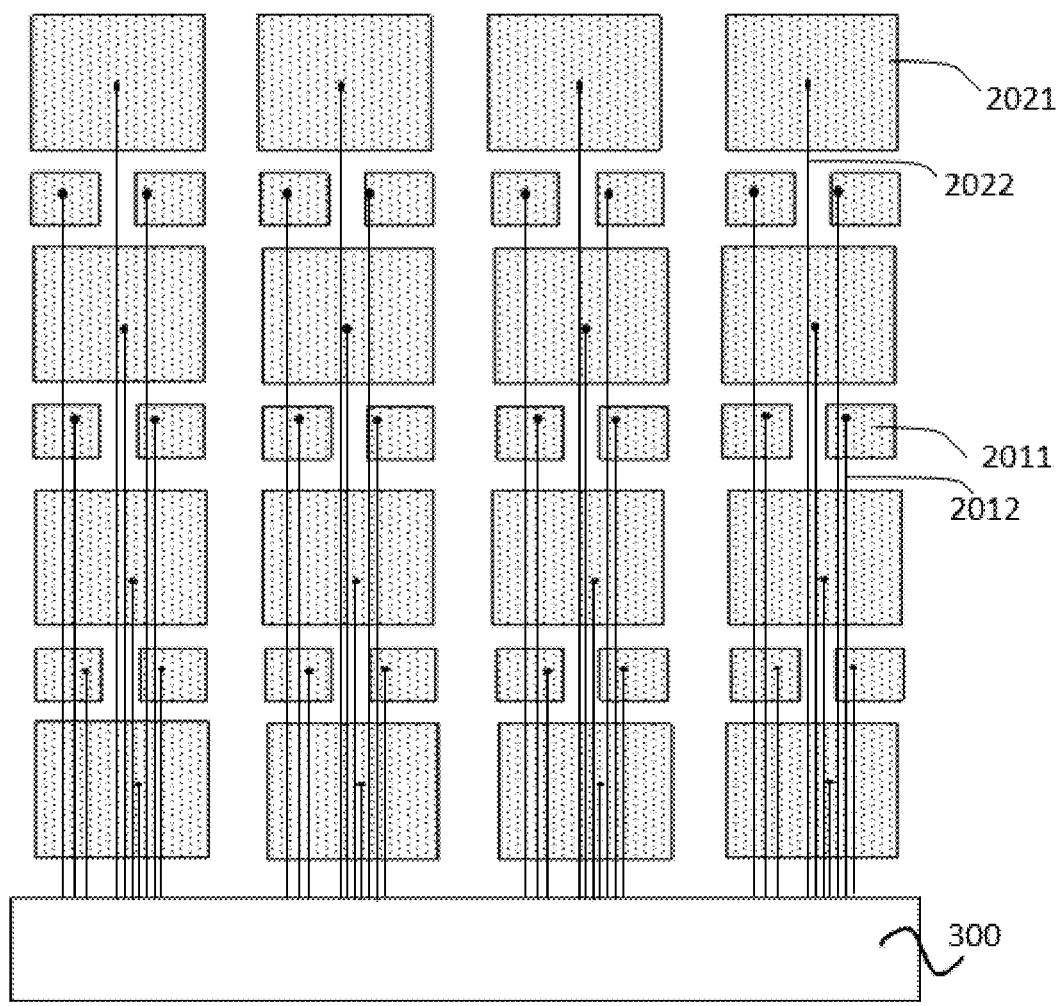
FIG. 9 illustrates a schematic view of another exemplary configuration of second force touch-control components and self-capacitance type touch-control electrodes, consistent with the disclosed embodiments.
Figure 10:
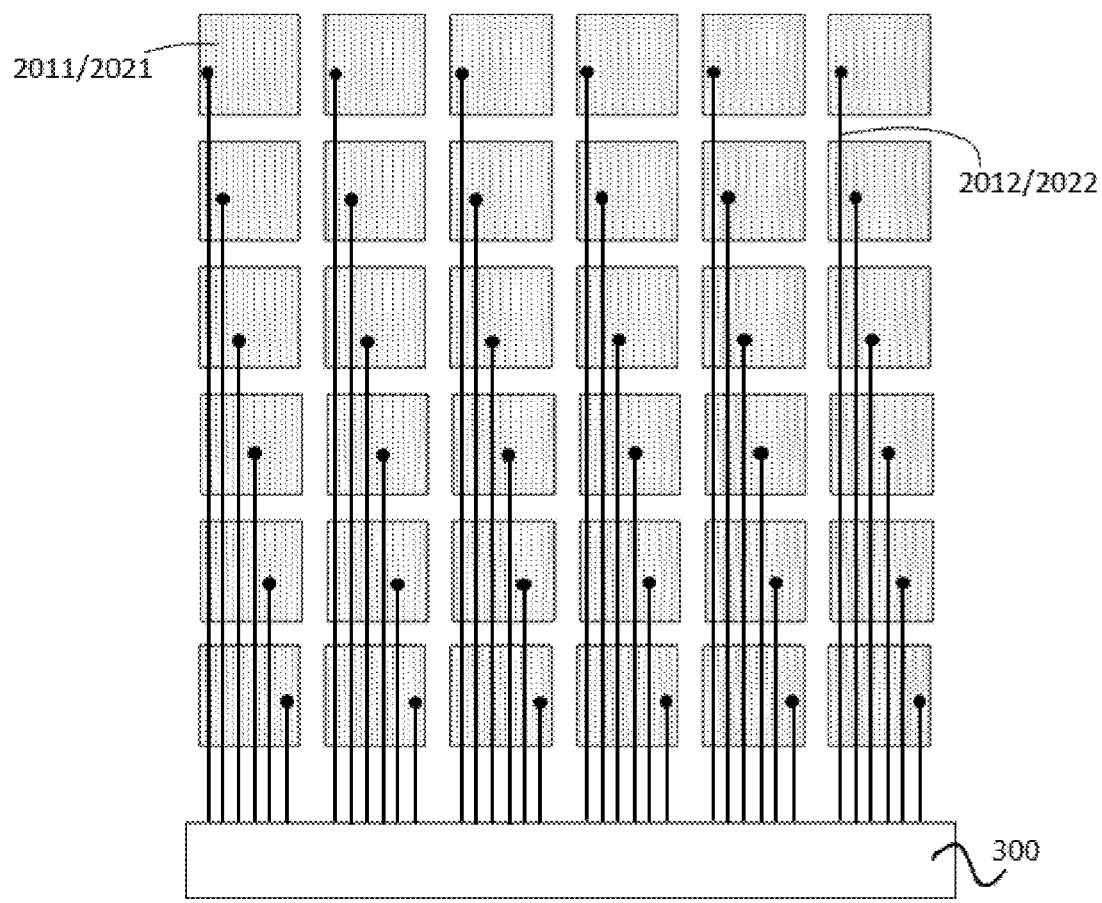
FIG. 10 illustrates a schematic view of another exemplary configuration of second force touch-control components and self-capacitance type touch-control electrodes, consistent with the disclosed embodiments.
Figure 11:
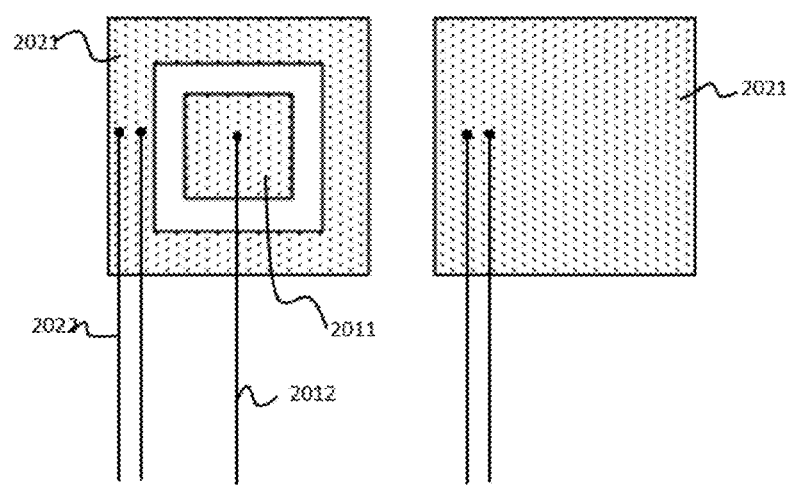
FIG. 11 illustrates a schematic view of exemplary electrode conducting wires consistent with the disclosed embodiments.

FIGS. 6-11 illustrate another embodiment of the present invention. FIGS. 6-10 illustrates five exemplary configurations of second force touch-control components and self-capacitance touch-control electrodes. FIG. 11 illustrates exemplary electrode conducting wires.

Figure 6:
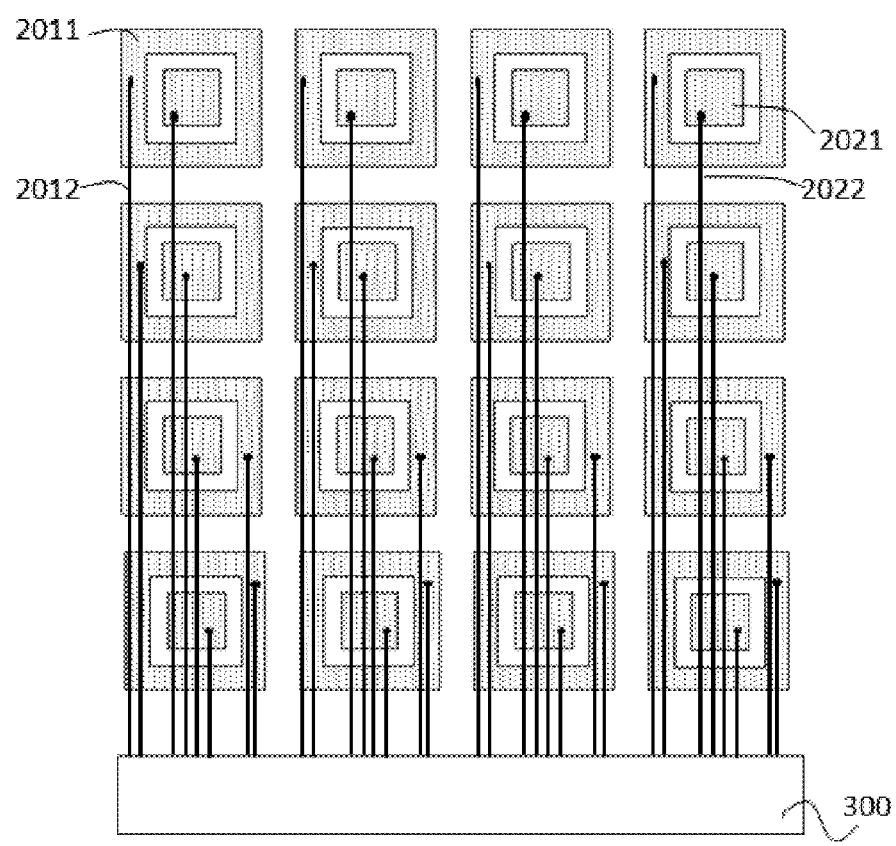
FIG. 6 illustrates a schematic view of an exemplary configuration of second force touch-control components and self-capacitance type touch-control electrodes, consistent with the disclosed embodiments.

FIG. 6 illustrates a schematic view of an exemplary configuration of second force touch-control components and self-capacitance touch-control electrodes. As shown in FIG. 6, the first electrodes 2011 are hollow electrodes, and the second electrodes 2021 are disposed within the hollow portions of the first electrodes 2011. There are engraved seams at the spacing between a first electrode 2011 and a second electrode 2021, making the first electrode 2011 and the second electrode 2021 be insulated from each other.

Figure 7:
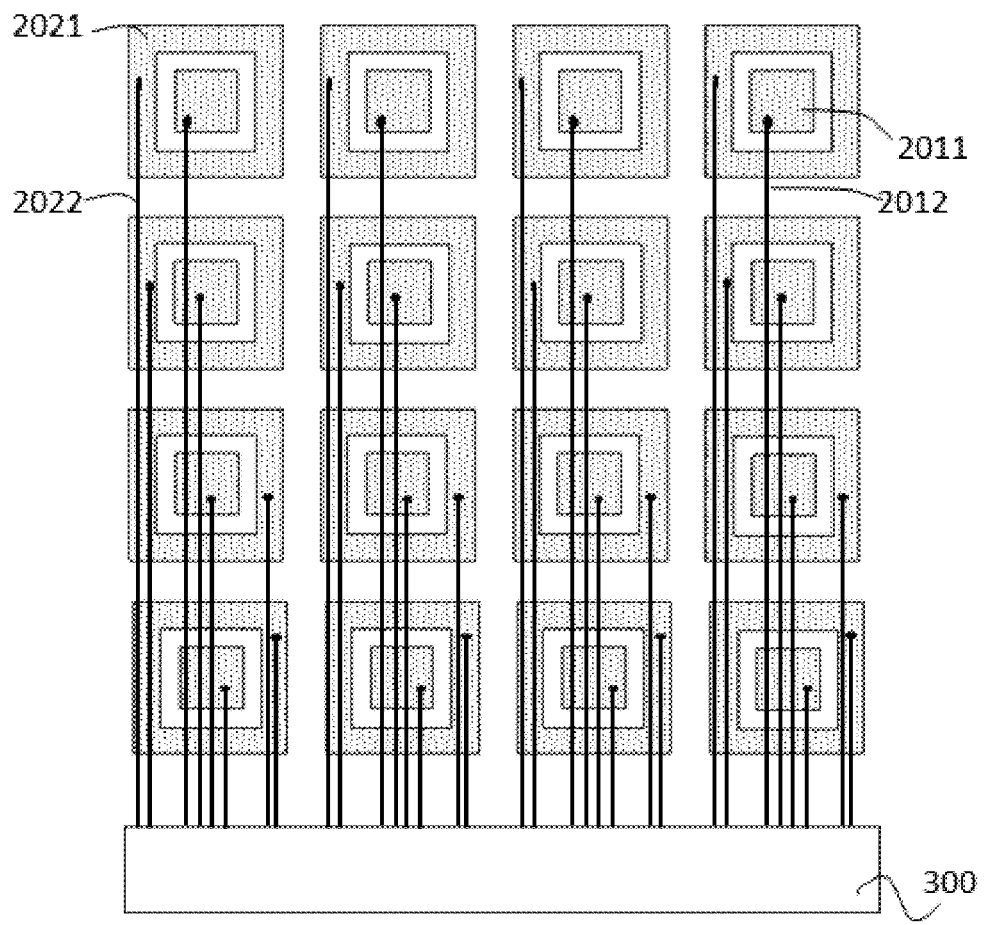
FIG. 7 illustrates a schematic view of another exemplary configuration of second force touch-control components and self-capacitance type touch-control electrodes, consistent with the disclosed embodiments.

FIG. 7 illustrates a schematic view of another exemplary configuration of second force touch-control components and self-capacitance touch-control electrodes. The second electrodes 2021 are hollow electrodes, and the first electrodes 2011 are disposed within the hollow portions of the second electrodes 2021. There are engraved seams at the spacing between a first electrode 2011 and a second electrode 2021, making the first electrode 2011 and the second electrode 2021 be insulated from each other.

In the two configurations shown in FIG. 6 and FIG. 7 respectively, either first electrodes 2011 or second electrodes 2021 are hollow electrodes, and the other electrodes are disposed inside the hollow electrodes. Therefore, both the first electrodes and the second electrodes may be uniformly distributed, and thus touch-control blind areas may be avoided in the touch-control side of an entire display device.

Further, in the configurations shown in FIG. 6 and FIG. 7, the sizes of the first electrodes and the second electrodes may be set according to actual requirements. For example, in FIG. 6, the second electrodes 2021 are small, and are disposed at the centers of the hollow first electrodes 2011. In FIG. 7, the first electrodes 2011 are small, and are disposed in the centers of the hollow second electrodes 2021. The sizes of the first electrodes and the second electrodes may be set according to actual requirements. However, the overall areas and positions of a set of first electrodes and second electrodes are not changed, reducing the design difficulty and variables.

In the configurations shown in FIG. 6 and FIG. 7, small electrodes are disposed at the centers of large electrodes. However, the hollow part of a large electrode may be not located at the exact center. The hollow part of a large electrode may shift to one side or one corner of the electrode, and a small electrode is correspondingly disposed within the hollow part of the large electrode.

Figure 8:
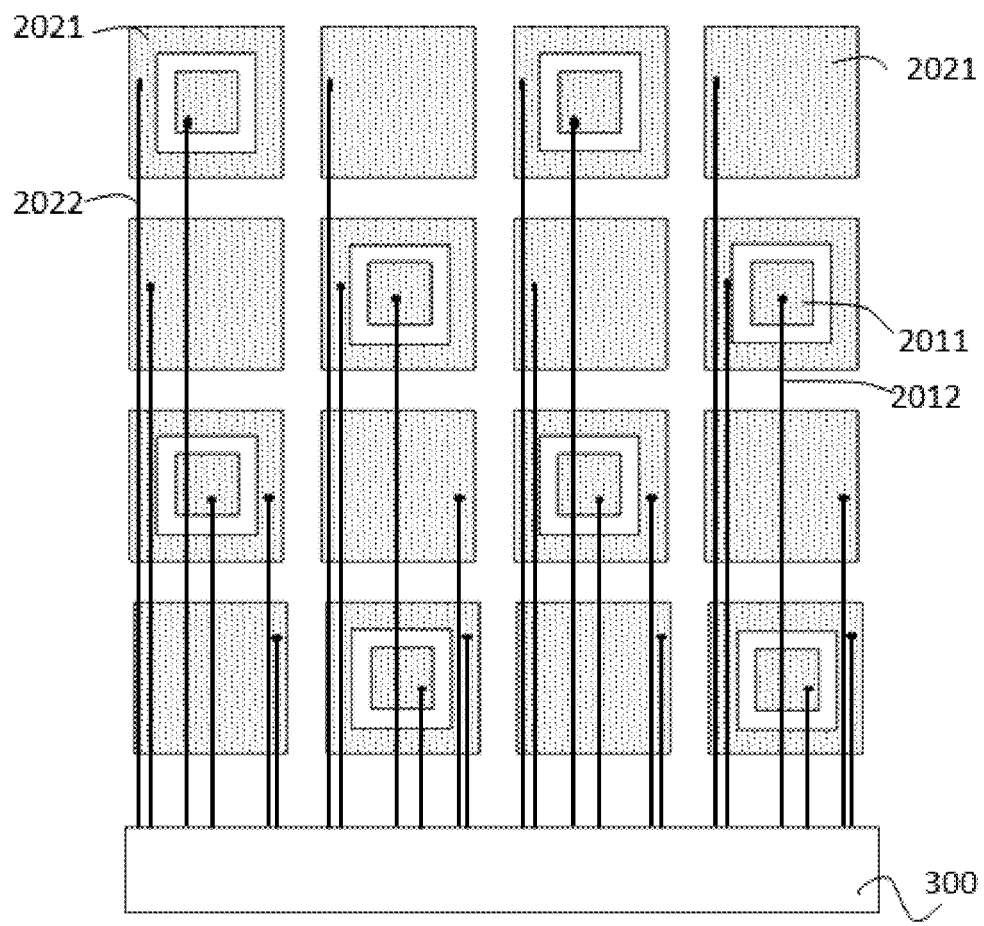
FIG. 8 illustrates a schematic view of another exemplary configuration of second force touch-control components and self-capacitance type touch-control electrodes, consistent with the disclosed embodiments.

FIG. 8 illustrates a schematic view of another exemplary configuration of second force touch-control components and self-capacitance touch-control electrodes. In FIG. 8, at least certain number of the second electrodes 2021 are hollow electrodes, and the other second electrodes 2021 are planar electrodes. That is, not all the second electrodes 2021 are hollow electrodes. For a hollow second electrode 2012, a first electrode 2011 may be disposed within the hollow portion of the hollow second electrode 2021, and there is an engraved seam between the second electrode 2021 and the first electrode 2011 inside. Thus, the distribution density of the first electrodes 2011 and the distribution density of the second electrodes 2021 can be different.

In some other configurations, at least certain number of the first electrodes are hollow electrodes, and the other first electrodes are planar electrodes. A second electrode is disposed in the hollow portion of a hollow first electrode, and there is an engraved seam between the hollow first electrode 2021 and the second electrode 2011 inside. The distribution densities of the first electrodes and the second electrodes may be set according to actual requirements.

In certain embodiments, the distribution density of second electrodes is greater than the distribution density of first electrodes. That is, the distribution density of self-capacitance touch-control electrodes is greater than the distribution density of the second force touch-control components. As shown in FIG. 8, at least certain number of the second electrodes 2021 are hollow electrodes, and the other second electrodes 2021 are planar electrodes. First electrodes 2011 are disposed within the hollow portions of the hollow second electrodes 2021. In a particular configuration, there are 464 second electrodes 2021, arranged in 16 rows and 29 columns, and there are 42 first electrodes 2011 arranged in 7 rows and 6 columns.

That is, in a row of second electrodes 2021, seven second electrodes 2021 are hollow electrodes, and a first electrode 2011 is disposed in each hollow second electrode 2021. In a column of second electrodes 2021, six second electrodes are hollow electrodes, and a first electrode 2011 is disposed in each hollow second electrode 2021. Further, the hollow second electrodes 2021 are uniformly distributed, and the first electrodes 2011 are also uniformly distributed. The numbers of first electrodes and second electrodes are not limited by the above specific configuration, and there may be different numbers of first electrodes and second electrodes.

The driving module 300 shown in FIGS. 6-8 provides both force detection and touch control detection, and correspondingly the driving method includes a force detection stage and a touch-control detection stage. In the force detection stage of an exemplary driving method, the driving module 300 provides a second force detection signal to a plurality of first electrodes 2011, and provides a first force detection signal to first force touch-control components 101, for detecting whether there is a region corresponding to a first electrode 2011 that is compressed by a pressure force, and for detecting the magnitude of the pressure force. In the touch-control detection stage of this exemplary driving method, the driving module 300 provides a touch-control detection signal to a plurality of second electrodes for detecting the location of touch-control occurrence.

In the force detection stage of another exemplary driving method, the driving module 300 provides a second force detection signal to a plurality of first electrodes 2011, and provides a first force detection signal to first force touch-control components 101, for detecting whether there is a region corresponding to a first electrode 2011 that is compressed by a pressure force and for detecting the magnitude of the pressure force. In the touch-control detection stage of this exemplary driving method, the driving module 300 provides a touch-control detection signal to a plurality of second electrodes 2021 and a plurality of first electrodes 2011, for detecting the location of touch-control occurrence. That is, in the touch-control detection stage of the present driving method, the touch-control detection signal is also applied to the plurality of first electrodes 2011 of a second force touch-control component. In this way, the detection strength of touch-control signals may be increased, and the effects on the detection of the touch-control signals due to the difference of electrode areas of the plurality of second electrodes may be decreased.

FIG. 9 illustrates a schematic view of another exemplary configuration with the second force touch-control component and self-capacitance touch-control electrodes. The plurality of second electrodes 2021 of the self-capacitive touch-control electrode are large electrodes. The plurality of second electrodes 2021 are arranged in a matrix, and there is a gap between adjacent second electrodes 2021. A plurality of first electrodes 2011 are disposed in the gaps between adjacent second electrodes 2021. The size of the first electrodes 2011 may be smaller than the size of the second electrodes 2021, such that two or more first electrodes 2011 may be disposed in the gap between two adjacent second electrodes 2021. The structure shown in FIG. 9 may also have a uniform distribution, avoiding the generation of blind touch-control areas.

FIG. 10 illustrates a schematic view of another exemplary configuration with second force touch-control components and self-capacitance touch-control electrodes. In the structure shown in FIG. 10, an electrode 2011/2021 may be both a first electrode 2011 and a second electrode 2021, and a conducting wire 2012/2022 may be both a first conducting wire 2012 and a second conducting wire 2022. That is, a first electrode 2011 of a first force touch-control component and a second electrode 2021 of a self-capacitance touch-control electrode are a reusable or multiplexed electrode; and a first conducting wire 2012 and a second conducting wire 2022 are a reusable or multiplexed conducting wire. In a touch-control detection stage, the driving module 300 provides a touch-control detection signal to a plurality of reusable electrodes 2011/2021. In the force detection stage, the driving module 300 provides a second force detection signal to a plurality of reusable conducting wires 2011/2021, and provides a first force detection signal to a first force touch-control component 101. Thus, the same electrode may be multiplexed in time to perform different touch-control detection functions.

FIG. 11 illustrates a schematic view of exemplary electrode conducting wires. In FIG. 11, the electrode configurations are similar to the electrode configurations shown in FIG. 7 and FIG. 8. At least a part of the second electrodes 2021 are hollow electrodes, and the other second electrodes 2021 are planar electrodes. A first electrode 2011 is disposed within the hollow portion of a hollow second electrode 2021. There is an engraved seam between the hollow second electrode 2021 and the first electrode 2011 inside the second electrode 2021. The second electrodes 2021 are large electrodes. To reduce the electrical resistance of the second electrodes 2021 and uniformly transmit signals, multiple second conducting wires 2022 are disposed corresponding to each second electrode 2021. In the example shown in FIG. 11, two second conducting wires 2022 are disposed for each second electrode 2021. More second conducting wires 2022 may be disposed for each second electrode 2021. The multiple second conducting wires 2022 may be disposed at one side of a second electrode 2021, and may also be uniformly disposed on a second electrode 2021.

The present exemplary embodiment provides multiple configurations of second force touch-control components and self-capacitance type touch-control electrodes. These configurations do not limit the scope of the present invention. It is within the protection scope of the present application as long as the plurality of first electrodes of second force touch-control components and a plurality of second electrodes of self-capacitance touch-control electrodes are disposed in a same layer.

Figure 12:
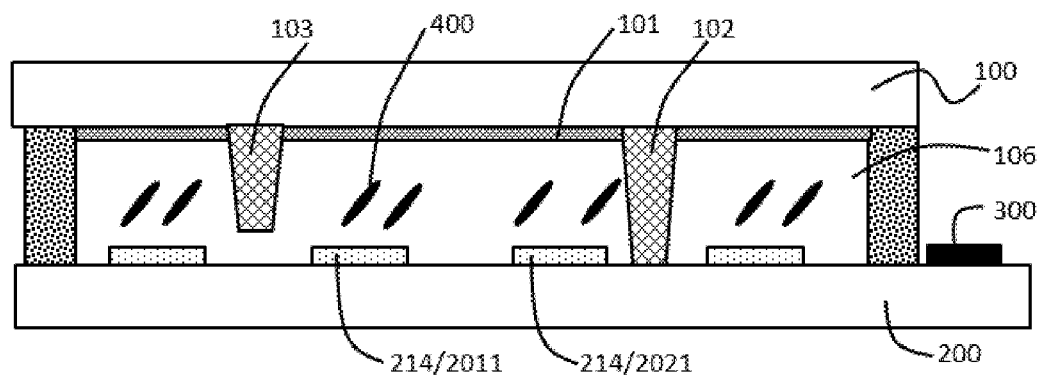
FIG. 12 illustrates a schematic view of another exemplary touch-control display device consistent with the disclosed embodiments.
Figure 13:
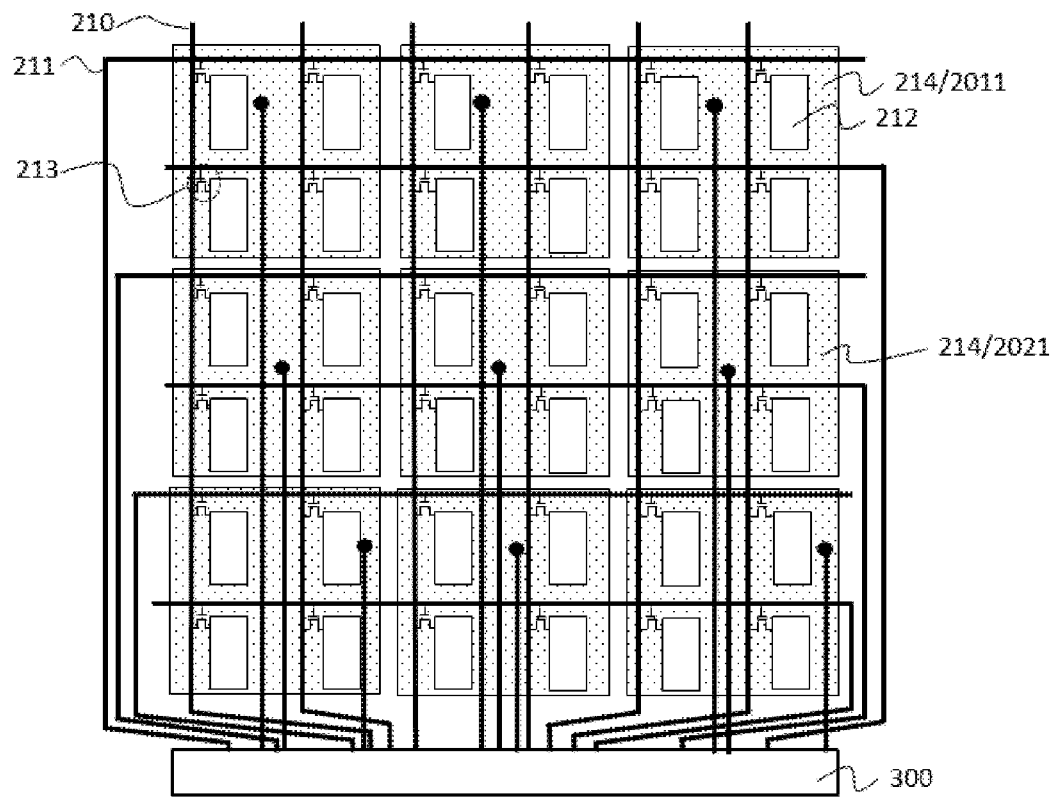
FIG. 13 illustrates a top view of an exemplary array substrate consistent with the disclosed embodiments.
Figure 14:
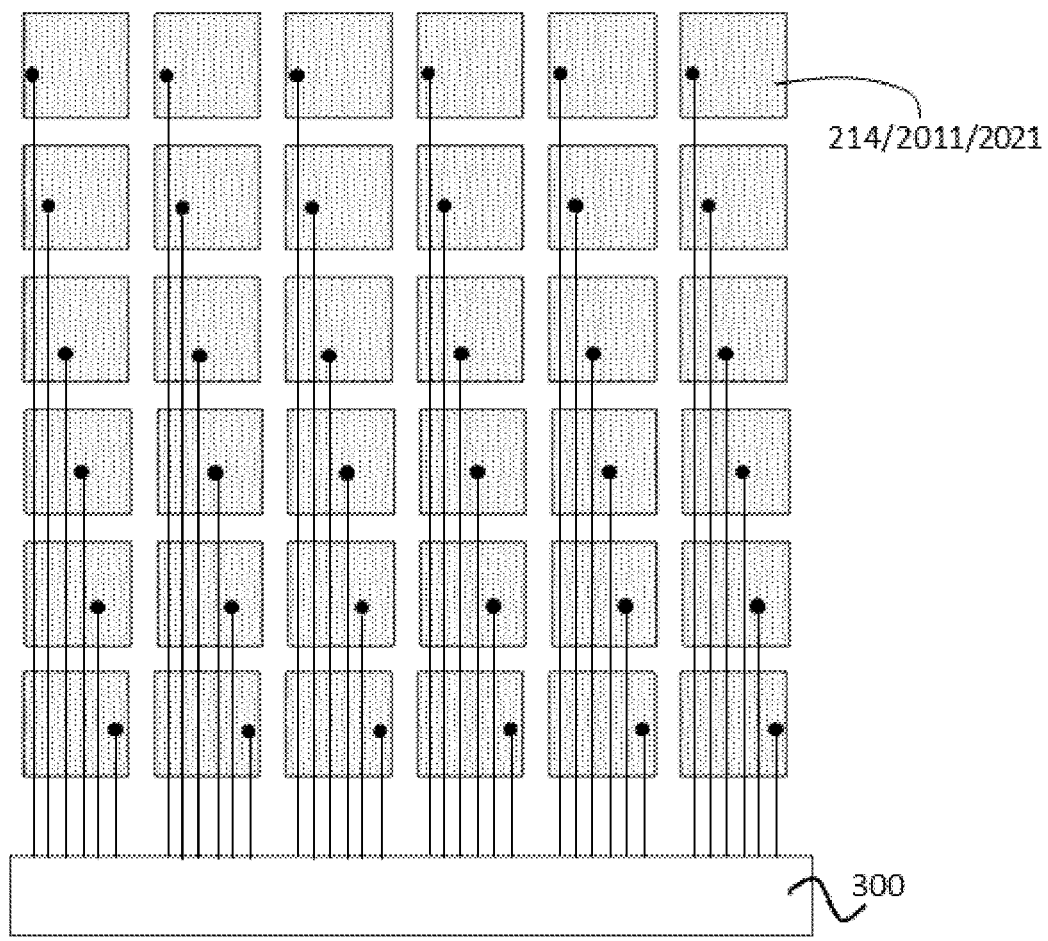
FIG. 14 illustrates a schematic view of another exemplary configuration of second force touch-control components and self-capacitance type touch-control electrodes, consistent with the disclosed embodiments.
Figure 15:
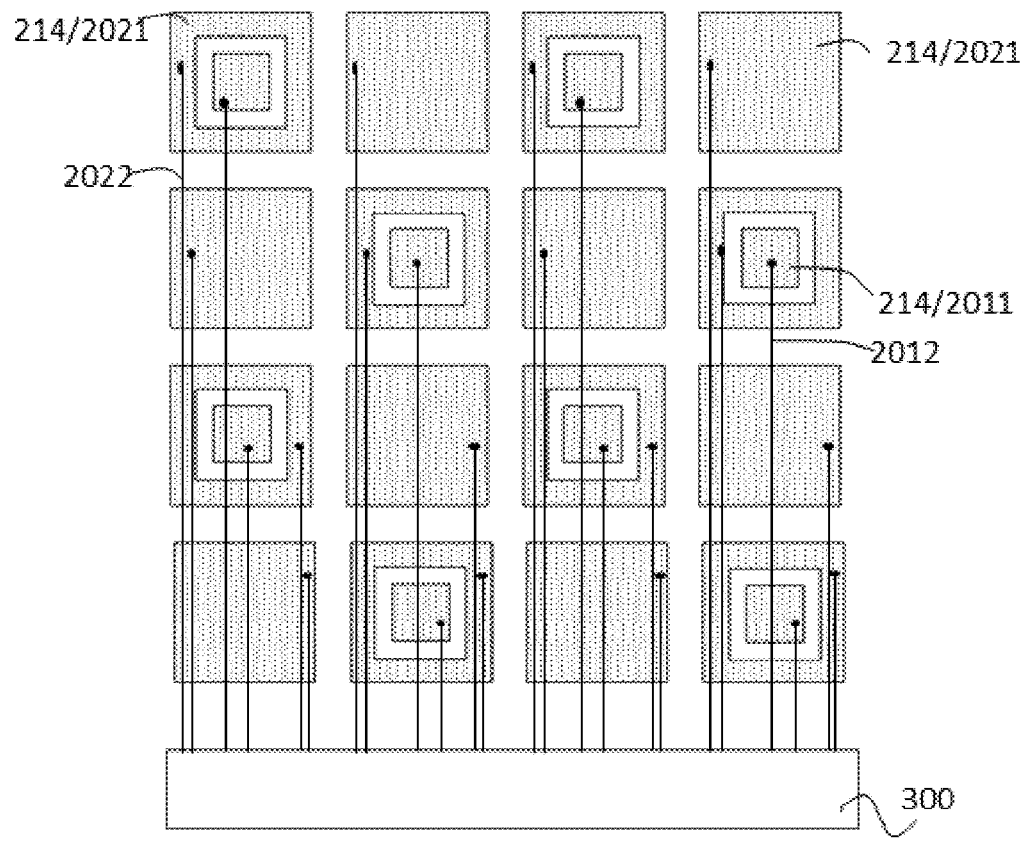
FIG. 15 illustrates a schematic view of another exemplary configuration of second force touch-control components and self-capacitance type touch-control electrodes, consistent with the disclosed embodiments.

FIGS. 12-15 illustrate another embodiment of the present invention. FIG. 12 illustrates a schematic view of the exemplary touch-control display device, and FIG. 13 illustrates a top view of the array substrate of the exemplary touch-control display device. FIG. 14 and FIG. 15 illustrate two other exemplary configurations of second force touch-control components and self-capacitance type touch-control electrodes.

As shown in FIG. 12 and FIG. 13, the exemplary touch-control display device is an in-plane field liquid crystal display device, comprising a color film substrate 100 and an oppositely disposed array substrate 200. The display device also comprises a plurality of data lines 210 and scanning lines 211 disposed on the array substrate 200, and the plurality of data lines 210 and scanning lines 211 intersect in an insulated way. The intersecting of the plurality of data lines 210 and scanning lines 211 defines a plurality of pixel units. Each pixel unit comprises a pixel electrode 212 and a switch control component 213. The display device further comprises a plurality of common electrodes 214 disposed on one side of the array substrate 200. The plurality of common electrodes 214 are arranged in a matrix, and spaced from each other.

The touch-control display device further comprises first force touch-control components 101 and second force touch-control components. A second force touch-control component comprises a plurality of first electrodes 2011 arranged in a matrix. The plurality of first electrodes 2011 are connected to a driving module 300 respectively through their corresponding first conducting wires. The touch-control display device also comprises self-capacitance type touch-control electrodes. A self-capacitance type touch-control electrode comprises a plurality of second electrodes 2021 arranged in a matrix. The plurality of second electrodes 2021 are connected to the driving module 300 through their corresponding second conducting wires respectively. The plurality of first electrodes 2011 of a second force touch-control component 201 and the plurality of second electrodes 2021 of a self-capacitance type touch-control electrode, and the common electrodes 214 are disposed in a same layer. The first force touch-control component 101 is disposed on the inner side of a color film substrate 100. A variable gap 106 is formed between the first touch-control component 101 and the second force touch-control component 201.

Specifically, as shown in FIG. 13, a part of the common electrodes 214 may also operate as the first electrodes 2011, and a part of the common electrode 214 may also operate as the second electrode 2021. In a display stage, the driving module 300 applies a common electrode signal to the plurality of common electrodes 214 to make the touch-control display device display images. In a force detection stage, the driving module 300 applies a second force detection signal to the plurality of common electrodes 214 operating as first electrodes 2011, and concurrently applies a first detection signal to the first force touch-control component, for detecting whether there is a pressure force applied on a first electrode 2011, and determining the magnitude of the pressure force. In a touch-control detection stage, the driving module 300 provides a touch-control detection signal to a plurality of common electrodes 214 operating as second electrodes 2021, for detecting the location of the touch-control occurrence. That is, electrodes 214 are multiplexed for various functions in both display and touch-control.

FIG. 14 illustrates another exemplary configuration of second force touch-control components and self-capacitance type touch-control electrodes. A plurality of electrodes 214/2011/2021 are disposed at a same layer. Each of the electrodes 214/2011/2021 is a reusable or multiplexed electrode. That is, each of the electrodes 214/2011/2021 may operate as a common electrode 214, a first electrode 2011 of a second force touch-control component, and a second electrode 2021 of a self-capacitance type touch-control electrode. In the display stage, the driving module 300 applies a common electrode signal to the plurality of electrodes 214/2011/2021, making the touch-control display device to display images. In the force detection stage, the driving module 300 applies a second force detection signal to the plurality of electrodes 214/2011/2021, and concurrently applies a first force detection signal to the first force touch-control component, for detecting whether there is a pressure force applied, and determining the magnitude of the pressure force. In the touch-control detection stage, the driving module 300 provides a touch-control detection signal to a plurality of electrodes 214/2011/2021, for detecting the location of the touch-control occurrence.

FIG. 15 illustrates another exemplary configuration of second force touch-control components and self-capacitance type touch-control electrodes. In this configuration, at least part of the common electrodes 214 are hollow electrodes, and other common electrodes 214 are planar electrodes. A first electrode 2011 is disposed inside a hollow common electrode 214. The planar common electrodes 214 and the hollow common electrodes 214 operate as the second electrodes 2021. A first electrode 2011 is connected to the driving module 300 through a first conducting wire 2012, and a second electrode 2021 is connected to the driving module 300 through a second conducting wire 2022. In the display stage, the driving module 300 applies a common electrode signal to the plurality of common electrodes 214 and first electrodes 2011, making the touch-control display device display images. In the force detection stage, the driving module 300 applies a second force detection signal to the plurality of first electrode 2011, and concurrently applies a first detection signal to the first force touch-control component, for detecting whether there is a pressure force applied, and determining the magnitude of the pressure force. In the touch-control detection stage, the drive module 300 provides a touch-control detection signal to the comments electrodes 214, for detecting the location of the touch-control occurrence.

Alternatively, the structure shown in FIG. 15 has another driving method. In the display stage, the driving module 300 applies a common electrode signal to the plurality of common electrodes 214 and first electrodes 2011, making the touch-control display device to display images. In the force detection stage, the driving module 300 applies a second force detection signal to the plurality of first electrodes 2011, and concurrently applies a first detection signal to the first force touch-control component, for detecting whether there is a pressure force applied, and determining the magnitude of the pressure force. In the touch-control detection stage, the drive module 300 provides a touch-control detection signal to both the second electrodes 2021 and the first electrodes 2011, to detect the location of the touch-control occurrence. That is, in the touch-control detection stage, the first electrodes 2021 are also used as self-capacitance type touch-control electrodes, increasing the detection strength of the touch-control signal, and reducing the effects on the detection of touch-control signals due to the difference of electrode areas of the plurality of second electrodes.

Thus, in the disclosed touch-control display device, the second force touch-control components, the self-capacitance type touch-control electrodes, and the common electrodes are integrated in a same layer. The display devices have a high integration, and are light and thin. Further, because the second force touch-control components, the self-capacitance type touch-control electrodes, and the common electrodes are integrated in a same layer, they may be formed in a same process step, and no additional process steps are needed, saving the fabricating costs. Furthermore, as the first force touch-control components, the second force touch-control components, and self-capacitance type touch-control electrodes are disposed on the inner sides of the two substrates, the touch-control display device has a good reliability.

Figure 16:
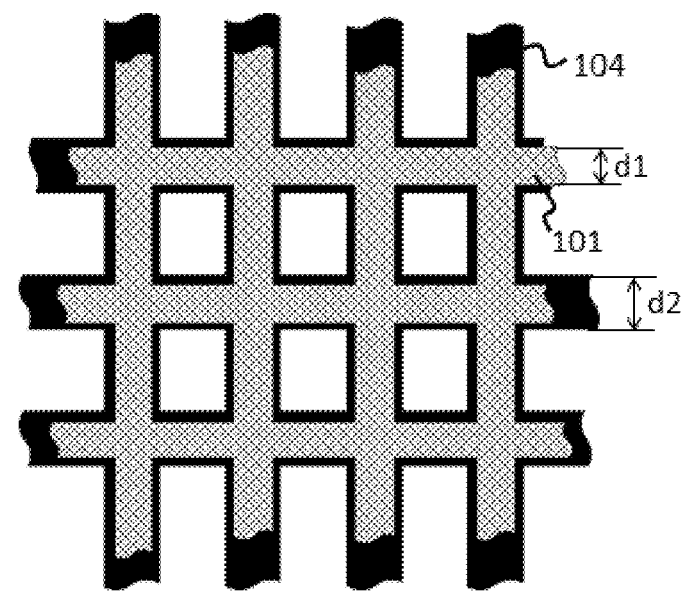
FIG. 16 illustrates a schematic view of an exemplary first force touch-control component consistent with the disclosed embodiments.
Figure 17:
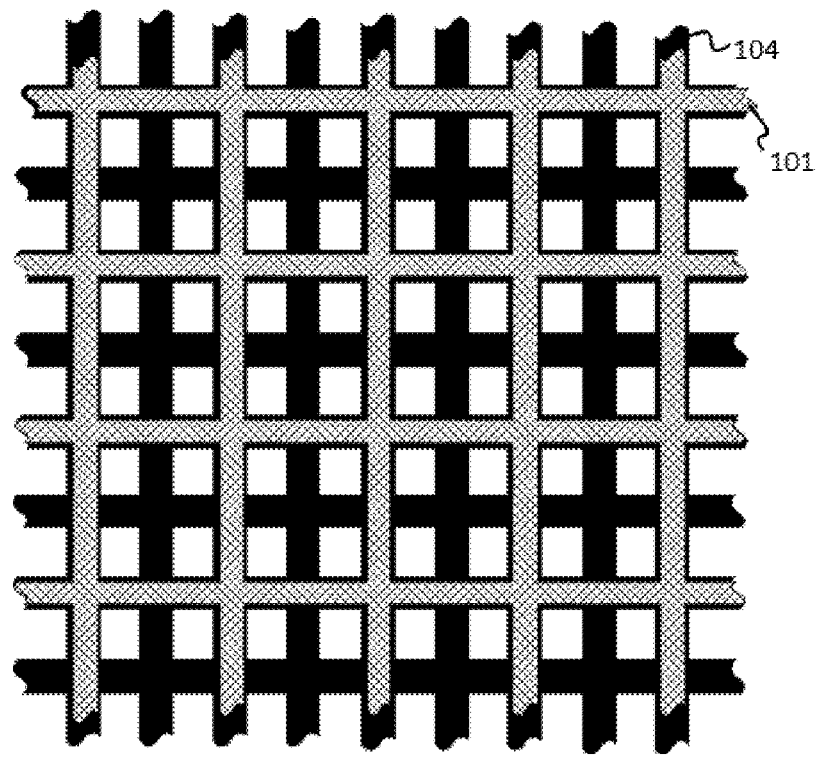
FIG. 17 illustrates a schematic view of another exemplary first force touch-control component consistent with the disclosed embodiments.
Figure 18:
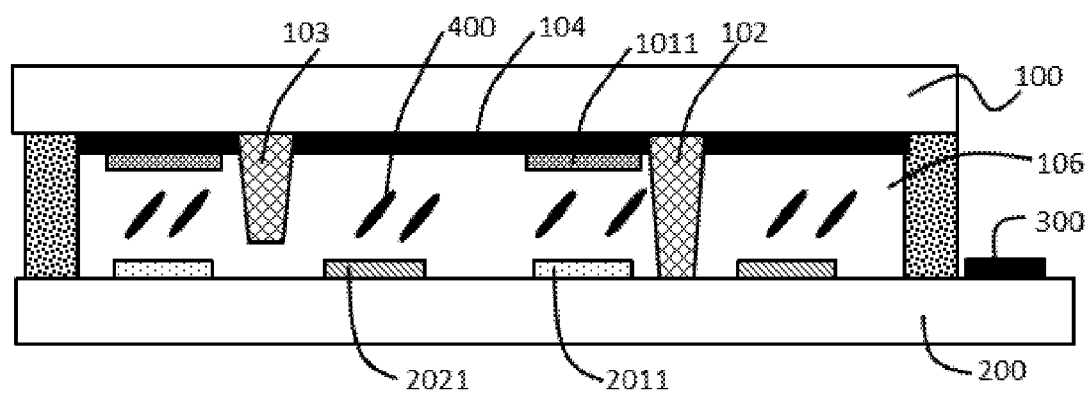
FIG. 18 illustrates a schematic view of another exemplary touch-control display device consistent with the disclosed embodiments.
Figure 19:
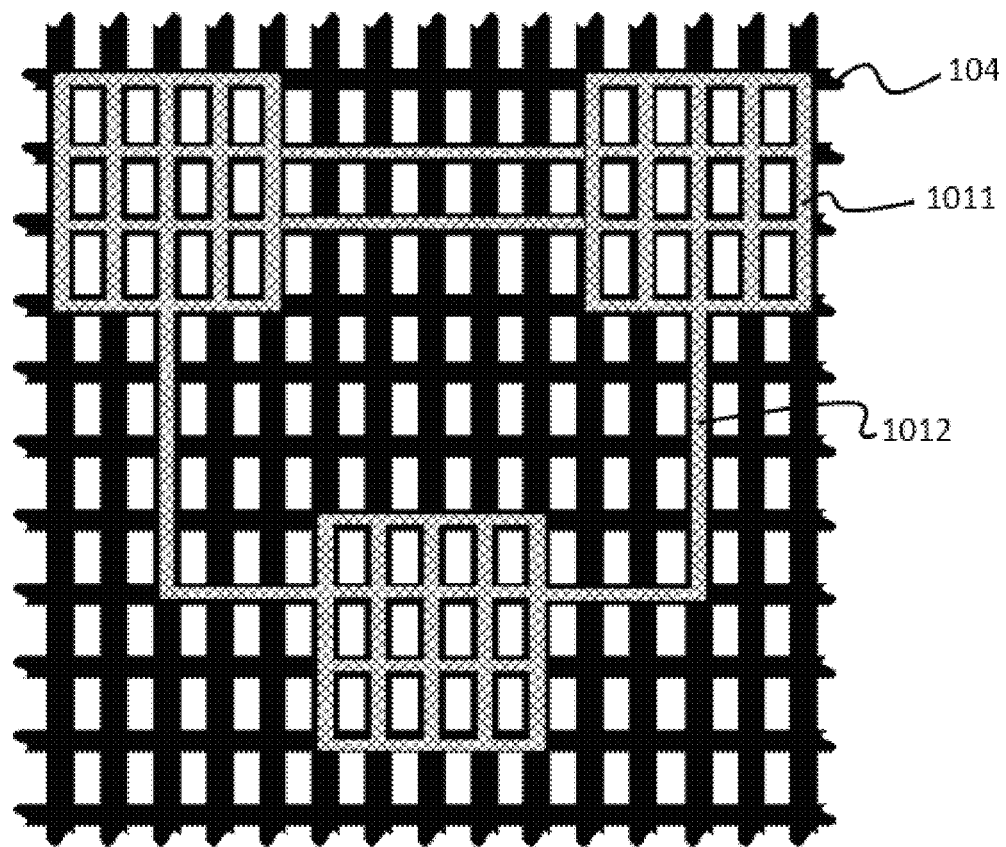
FIG. 19 illustrates a schematic view of a first force touch-control component in the configuration shown in FIG. 18.
Figure 20:
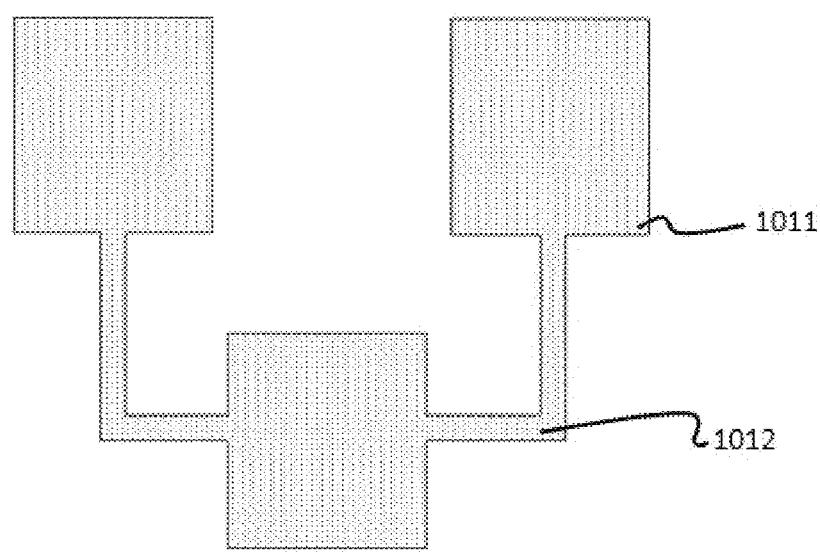
FIG. 20 illustrates a schematic view of another exemplary first force touch-control component consistent with the disclosed embodiments.

FIGS. 16-20 illustrate another embodiment of the present invention. FIG. 16 illustrates a schematic view of an exemplary first force touch-control component. FIG. 17 illustrates a schematic view of another exemplary first force touch-control component. FIG. 18 and FIG. 19 illustrate a schematic structural view of another exemplary first force touch-control component. FIG. 20 illustrates a schematic structural view of another exemplary first force touch-control component.

In the embodiment shown in FIG. 1, the first force touch-control component disposed on the inner side of a color film substrate 100 is a transparent electrode covering the entire surface, and specifically, its material may be indium tin oxide and the like. While in the present embodiment, the first force touch-control component has a metal grid structure, as shown in FIG. 16. The metal grid comprises a plurality of horizontal and vertical metal strips that intersect each other, and the material of the metal grid layer may be a metal or an alloy.

A black matrix 104 is disposed on the inner side of the color film substrate. The metal grid of the first force touch-control component 101 is closer to the liquid crystal layer than the black matrix 104. In the light transmitting direction, the projection of the metal grid-like first force touch-control component 101 falls within the projection of the black matrix 104 of the color film substrate. The width d1 of the metal strips may be equal to or less than the width d2 of the strips in the black matrix 104. By using the metal grid as a first force touch-control component 101, and covering the metal grid with a black matrix block, the first force touch-control component 101 may not be seen by human eyes, and it does not affect the transmission rate of the display device. Further, the present structure may reduce the shielding of the touch-control signal of the self-capacitance type touch-control electrode on the array substrate, and have excellent display effects and function of detecting touch-control position.

In some other configurations, a transparent conductive material may be used to form a grid-like first force touch-control component. That is, the first force touch-control component has a grid-like structure, and its material may be a metal or a transparent conducting material, such as oxide indium tin and the like. In the light transmitting direction, the projection of the grid-like first force touch-control component 101 falls within the projection of the black matrix 104 of the color film substrate.

FIG. 17 illustrates another exemplary first force touch-control component. In the structure shown in FIG. 16, the setting densities of the metal grid and the black matrix are the same, i.e. there is a metal strip under each strip of the black matrix. In the structure shown in FIG. 17, the setting density of the metal grid of the first force touch-control component 101 is lower than the setting density of the black matrix 104. Metal strips are disposed under some strips of the black matrix 104, while under other strips of the black matrix 104, no metal strips are disposed. A high setting density of metal grid may reduce the electrical resistance of the first force touch component 101, while a low setting density of metal grid may reduce the shielding of the touch-control signal of self-capacitance type touch-control electrodes. The setting density of a metal grid may be adjusted according to actual requirements.

FIG. 18 and FIG. 19 illustrates another configuration of touch-control display device and its first force touch-control component. The first force touch-control component 101 comprises a plurality of metal grid electrodes 1011 arranged in a matrix. Each metal grid electrode 1011 corresponds to a first electrode 2011, and the plurality of metal grid electrodes 1011 are electrically connected through metal traces 1012. The plurality of metal grid electrodes 1011 are closer to the liquid crystal layer than the black matrix 104. In the light transmitting direction, the projection of the plurality of metal grid electrode 1011 falls within the projection of the black matrix 104. A first electrode 2011, a metal grid electrode 1011, and a variable gap 106 together form a variable capacitor. The metal grid electrodes 1011 are only disposed above the first electrodes 2011, and no metal mesh electrodes 1011 are disposed above the self-capacitance type touch-control electrodes 202. In this way, the shielding of the touch-control signal of self-capacitance type touch-control electrode may be further reduced while keeping the effect of force touch-control detection unchanged. The setting density of the metal grid electrodes may be equal to or less than the setting density of the black matrix.

In some other configurations, a transparent conductive material may be used to form a grid electrode. That is, a first force touch-control component comprises a plurality of grid electrodes, and the material of the grid electrodes may be a metal or a transparent conducting material such as indium tin oxide and the like. In the light transmitting direction, the projection of the grid electrodes of the first force touch-control component falls within the projection of the black matrix on the color film substrate. The setting density of the grid electrodes may be equal to or less than the setting density of the black matrix.

FIG. 20 illustrates another exemplary first force touch-control component. As shown in FIG. 20, the first force touch-control component comprises a plurality of block electrodes 1011 that are periodically and uniformly arranged. Each block electrode 1101 corresponds to a first electrode, and the plurality of block electrodes 1011 are electrically connected to each other through traces 1012. The material of the plurality of block electrodes 1011 may be a transparent conductive material, such as indium tin oxide (ITO) and the like. The material of the traces 1012 may be the same as the material of the block electrodes 1011.

There are a variety of structures and materials for first force touch-control component. The above specific configurations do not limit the scope of the present invention. It is within the protection scope of the present application as long as an object is disposed on the inner side of a first substrate, and may operate as an electrode of a force touch-control component.

The embodiments disclosed herein are exemplary only and not limiting the scope of this disclosure. Various combinations, alternations, modifications, or equivalents to the technical solutions of the disclosed embodiments can be obvious to those skilled in the art and can be included in this disclosure. Without departing from the spirit and scope of this invention, such other modifications, equivalents, or improvements to the disclosed embodiments are intended to be encompassed within the scope of the present disclosure.

What is claimed is:

1. A touch-control display device, comprising:
a driving module;
a first substrate disposed with one or more first force touch-control components; and
a second substrate disposed with one or more second force touch-control components and one or more self-capacitance type touch-control electrodes,
wherein:
the first substrate and the second substrate are oppositely disposed, with a variable gap between the first substrate and the second substrate,
a plurality of supporting columns for supporting the variable gap is disposed between the first substrate and the second substrate, the plurality of supporting columns non-overlapping with the one or more first force touch-control components, the one or more second force touch-control components and the one or more self-capacitance type touch-control electrodes, along a direction perpendicular to the second substrate,
the one or more first force touch-control components have a grid-like structure, and a black matrix with a grid-like structure is disposed on an inner side of the first substrate, the grid-like structure of the one or more first force touch-control components being completely overlapped with the grid-like structure of the black matrix,
the one or more second force touch-control components comprise a plurality of first electrodes arranged in a matrix with a plurality of rows, and the plurality of first electrodes are connected to the driving module respectively through their corresponding first conducting wires,
the one or more self-capacitance type touch-control electrodes comprise a plurality of second electrodes arranged in a matrix with a plurality of rows, and the plurality of second electrodes are connected to the driving module respectively through their corresponding second conducting wires,
the plurality of second electrodes of the one or more self-capacitance type touch-control electrodes and the plurality of first electrodes of the one or more second force touch-control components are disposed in a same layer,
the touch-control display device is a liquid crystal display device, the first substrate is a color film substrate, the second substrate is an array substrate, and a liquid crystal layer is disposed between the color film substrate and the array substrate,
when the plurality of first electrodes includes at least certain number of hollow electrodes, the plurality of second electrodes are disposed in the hollow portions of the plurality of first electrodes, when the plurality of second electrodes includes at least certain number of hollow electrodes, the plurality of first electrodes are disposed in the hollow portions of the plurality of second electrodes, and each row of the matrix includes one or more of the hollow electrodes.

2. The touch-control display device according to claim 1, wherein:
in a touch-control detection stage, the driving module provides a touch-control detection signal to the plurality of second electrodes; and
in a force detection stage, the driving module provides a second force detection signal to the plurality of first electrodes, and provides a first force detection signal to the one or more first force touch-control components.

3. The touch-control display device according to claim 1, wherein the plurality of first electrodes further includes planar electrodes, the hollow electrodes and the planar electrodes are alternatively arranged.

4. The touch-control display device according to claim 1, wherein the plurality of second electrodes further includes planar electrodes, the hollow electrodes and the planar electrodes are alternatively arranged.

5. The touch-control display device according to claim 1, wherein each of the first electrodes and each of the second electrodes are multiplexed as a same electrode, and each of the first conducting wires and each of the second conducting wires are multiplexed as a same conducting wire.

6. The touch-control display device according to claim 5, wherein:
in a touch-control detection stage, the driving module provides a touch-control detection signal to the multiplexed electrodes; and
in a force detection stage, the driving module provides a second force detection signal to the multiplexed electrodes, and provides a first force detection signal to the one or more first force touch-control components.

7. The touch-control display device according to claim 1, wherein, common electrodes are disposed on the array substrate; and the one or more second force touch-control components, the common electrodes, and the one or more self-capacitance type touch-control electrodes are disposed in a same layer.

8. The touch-control display device according to claim 7, wherein one part of the common electrodes are multiplexed as the plurality of first electrodes, and another part of the common electrodes are multiplexed as the plurality of second electrodes.

9. The touch-control display device according to claim 8, wherein:
in a display stage, the driving module applies a common electrode signal to the common electrodes;
in a force detection stage, the driving module applies a second force detection signal to the part of the common electrodes multiplexed as the plurality of first electrodes, and concurrently applies a first force detection signal to the one or more first force touch-control components; and
in a touch-control detection stage, the driving module provides a touch-control detection signal to the another part of the common electrodes multiplexed as the plurality of second electrodes.

10. The touch-control display device according to claim 1, wherein:
in a light transmitting direction, a distance between the one or more first force touch-control components and the second substrate is smaller than a distance between the black matrix and the second substrate, and a projection of the one or more grid-like first force touch-control components falls within the black matrix.

11. The touch-control display device according to claim 1, wherein:
the one or more first force touch-control components comprises a plurality of grid electrodes arranged in a matrix, each grid electrode corresponds to a first electrode, and the plurality of grid electrodes are electrically connected;
in a light transmitting direction, a distance between the one or more first force touch-control components and the second substrate is smaller than a distance between the black matrix and the second substrate, and each grid electrode is completely overlapped with the grid-like structure of the black matrix.

12. The touch-control display device according to claim 1, wherein the one or more first force touch-control components comprises a plurality of block electrodes arranged in a matrix, each of the plurality of block electrodes corresponds to a first electrode of the plurality of first electrodes, and the plurality of block electrodes are electrically connected to each other.

13. The touch-control display device according to claim 1, wherein the one or more first force touch-control components are a planar electrode covering an entire inner side of the first substrate, and material of the one or more first force touch-control components is a transparent conductive metal material.

14. The touch-control display device according to claim 1, wherein material of the one or more first force touch-control components is a metal or a transparent conductive material.

15. A touch-control display device, comprising:
a driving module;
a first substrate disposed with one or more first force touch-control components; and
a second substrate disposed with one or more second force touch-control components and one or more self-capacitance type touch-control electrodes,
wherein:
the first substrate and the second substrate are oppositely disposed, with a variable gap between the first substrate and the second substrate;
a plurality of supporting columns for supporting the variable gap is disposed between the first substrate and the second substrate, the plurality of supporting columns non-overlapping with the one or more first force touch-control components, the one or more second force touch-control components and the one or more self-capacitance type touch-control electrodes, along a direction perpendicular to the second substrate;
the one or more first force touch-control components have a grid-like structure, and a black matrix with a grid-like structure is disposed on an inner side of the first substrate, the grid-like structure of the one or more first force touch-control components being completely overlapped with the grid-like structure of the black matrix;
the one or more second force touch-control components comprises a plurality of first electrodes arranged in a matrix with a plurality of rows, and the plurality of first electrodes are connected to the driving module respectively through their corresponding first conducting wires;

the one or more self-capacitance type touch-control electrodes comprises a plurality of second electrodes arranged in a matrix with a plurality of rows, and the plurality of second electrodes are connected to the driving module respectively through their corresponding second conducting wires;

the plurality of second electrodes of the one or more self-capacitance type touch-control electrodes and the plurality of first electrodes of the one or more second force touch-control components are disposed in a same layer, wherein:

there is a gap between adjacent second electrodes of the plurality of second electrodes;

two or more first electrodes are disposed in the gap between the two adjacent second electrodes; and a size of a first electrode of the plurality of first electrodes is smaller than a size of a second electrode of the plurality of second electrodes;

when the plurality of first electrodes includes at least certain number of hollow electrodes, the plurality of second electrodes are disposed in the hollow portions of the plurality of first electrodes;

when the plurality of second electrodes includes at least certain number of hollow electrodes, the plurality of first electrodes are disposed in the hollow portions of the plurality of second electrodes; and each row of the matrix includes one or more of the hollow electrodes.

16. The touch-control display device according to claim 1, wherein at least one of the plurality of second electrodes is connected to the driving module respectively through two or more corresponding second conducting wires.

17. The touch-control display device according to claim 15, wherein:

in a touch-control detection stage, the driving module provides a touch-control detection signal to the plurality of second electrodes; and in a force detection stage, the driving module provides a second force detection signal to the plurality of first electrodes, and provides a first force detection signal to the one or more first force touch-control components.

18. The touch-control display device according to claim 15, wherein:

each of the plurality of first electrodes and each of the plurality of second electrodes are multiplexed as a same electrode, and each of the first conducting wires and each of the second conducting wires are multiplexed as a same conducting wire.

19. The touch-control display device according to claim 18, wherein:

in a touch-control detection stage, the driving module provides a touch-control detection signal to the multiplexed electrode; and in a force detection stage, the driving module provides a second force detection signal to the multiplexed electrode, and provides a first force detection signal to the one or more first force touch-control components.

20. The touch-control display device according to claim 15, wherein:

common electrodes are disposed on the array substrate; and the one or more second force touch-control components, the common electrodes, and the one or more self-capacitance type touch-control electrodes are disposed in a same layer.

* * * * *